United States Patent [19]

Alanara

[11] Patent Number: 5,604,921
[45] Date of Patent: Feb. 18, 1997

[54] RADIOTELEPHONE USER INTERFACE FOR BROADCAST SHORT MESSAGE SERVICE

[75] Inventor: Seppo M. Alanara, Oulu, Finland

[73] Assignee: Nokia Mobile Phones Ltd., Salo, Finland

[21] Appl. No.: 499,165

[22] Filed: Jul. 7, 1995

[51] Int. Cl.[6] .................................................. H04B 1/68
[52] U.S. Cl. ...................... 455/45; 455/38.4; 455/186.2
[58] Field of Search ...................... 455/38.4, 45, 186.1, 455/186.2, 161.1, 161.2, 161.3; 379/59; 340/825.26, 825.27

[56] References Cited

U.S. PATENT DOCUMENTS

| | | | |
|---|---|---|---|
| 4,680,787 | 7/1987 | Marry | 379/63 |
| 5,335,276 | 8/1994 | Thompson et al. | 455/74 |
| 5,404,355 | 4/1995 | Raith | 379/59 |
| 5,406,626 | 4/1995 | Ryan | 455/45 |
| 5,465,401 | 11/1995 | Thompson | 455/89 |
| 5,491,838 | 2/1996 | Takahisa et al. | 455/186.1 |

OTHER PUBLICATIONS

"S-BCCH for IS-136" (Ericsson) Jun. 12–15, 1995, Digital Cellular Systems TR45.3 6/95.06 13.18
"IS136 Broadcast SMS" Secs. 2.2–2.4 (Dec. 1994).

Primary Examiner—Reinhard J. Eisenzopf
Assistant Examiner—Nguyen Vo
Attorney, Agent, or Firm—Perman & Green

[57] ABSTRACT

This invention pertains to a method for operating a radiotelephone for receiving digitally encoded broadcast messages from a radio channel, and also to a radiotelephone that operates in accordance with the method. The method includes a first step of operating a user interface (19, 20, 22) for inputting information to a controller (20) of the radiotelephone, the information specifying at least one category of broadcast message to be received. In response to the inputted information, a second step receives a broadcast message that belongs to the at least one category. A third step stores all or a portion of the received message in a memory (21) of the radiotelephone. A fourth step selectively displays (19) all or a portion of the stored message. In a presently preferred embodiment of this invention the message is received from a short message service broadcast channel.

20 Claims, 2 Drawing Sheets

RADIOTELEPHONE USER INTERFACE FOR BROADCAST SHORT MESSAGE SERVICE

FIELD OF THE INVENTION

This invention relates generally to radiotelephone receivers and, in particular, to radiotelephone, that receives messages that are broadcast over a digital control channel (DCCH).

BACKGROUND OF THE INVENTION

A Short Message Service Broadcast Channel (S-BCCH), in the IS-136 rev. 0 specification, is specified for use in sending short point-to-multipoint messages to mobile stations, such as radiotelephones. A maximum number of 15 slots per superframe may be assigned to the S-BCCH logical channel. The S-BCCH is considered as a continuous channel even if more than one slot is allocated to the S-BCCH. The IS-136 rev. 0 specification does not specify particulars of this mode of operation, except for the level 2 reservation of slots within a superframe.

One possible implementation for such a system is as follows. This implementation is similar to that originally set forth in the preliminary IS-136 rev. 0 specification.

The SMS frame can be defined as a sequence of 24 Superframes which are aligned with a Hyperframe (HF) counter. Thus, the number of slots assigned to the SMS frame are 0, 24, 48, 72, depending on how many slots per superframe are assigned to BCCH.

The Hyperframe (HF) counter and a Primary Superframe (SF) indicator can be provided in the DCCH. These two counters together (2*HF Counter+Primary SF indicator) constitute a Superframe counter. A SMS frame is defined to be a single complete cycle (0–23) of the SF counter. The SMS frame is aligned to start at a HF counter value of 0, and also when the Primary Superframe indicator equals 0. The SF counter provides SMS frame synchronization information to the mobile station.

SMS subchannels are defined to allow different repetition cycles for different messages. Each subchannel has its own repetition cycle defined in terms of units of SMS frames. SMS frames are grouped into the SMS subchannels. Within each subchannel, a repetition cycle is defined (in units of SMS frames) with which the SMS broadcast message sequences contained in the SMS sub-channel are repeated. The SMS broadcast subchannel cycle may range from 1 to 64 SMS frames in length. Within each subchannel, the first S-BCCH slot within each SMS frame contains a header that describes the structure of the subchannel. Up to four subchannels may be defined. If more than one subchannel exists, the subchannels are time-multiplexed onto the S-BCCH channel on a SMS frame basis. If a SMS subchannel block is defined to consist of one SMS frame from each subchannel, placed in ascending order of subchannel number, then the multiplexed subchannels can be defined as the repetition of these subchannel blocks. The number of subchannels and the identity of the subchannel to which an SMS frame belongs are specified in the SMS frame header.

According to SMS header information found in the first slot in any SMS frame, the set of messages in SMS(i) may span M(i) number of SMS frames before a cycle is completed. M(i) is the length of the sub-channel cycle. The SMS frame number within the subchannel cycle is referred to as the phase of the subchannel cycle.

A number of different BCCH message categories can be defined. These include Emergency Information messages, Time and Date messages, Overload Class messages, System Identity messages, and Broadcast messages. Each BCCH message typically includes a number of fields of information. These fields can include: a Protocol Discriminator field (2 bits), a Message Type field (6 bits), a SMS Message ID field (8 bits), and a Text Message Data field (8 to 2024 bits).

The Broadcast Message category field is coded to provide a number of different types of message category identifiers. These include, by example, emergency numbers and roadside information, toll gate information, airline departure/arrival information, weather-related information, news, and financial information.

As may be appreciated, it is important to provide a user of a radiotelephone an ability to specify what types of SMS Broadcast messages that the user is interested in receiving. It is also important to provide the user with other SMS Broadcast-related capabilities, such as an ability to selectively enable and disable the reception of these messages, an ability to generate with the radiotelephone different indications of message-related conditions, and an ability to control the storage and display of messages.

SUMMARY OF THE INVENTION

The foregoing and other problems are overcome and the objects of the invention are realized by a method for operating a radiotelephone for receiving digitally encoded broadcast messages from a radio channel, and by a radiotelephone that operates in accordance with the method. The method includes a first step of operating a user interface for inputting information to a controller of the radiotelephone, the information specifying at least one category of broadcast message to be received. In response to the inputted information, a second step receives a broadcast message that belongs to the at least one category. A third step stores all or a portion of the received message in a memory of the radiotelephone. A fourth step selectively displays all or a portion of the stored message. In a presently preferred embodiment of this invention the message is received from a short message service broadcast channel.

Further in accordance with this invention the step of inputting includes a step of specifying whether or not to display a stored message, and the step of displaying displays all or a portion of the stored message only when the message is specified to be displayed.

Further in accordance with this invention the step of inputting includes a step of specifying whether or not to generate an audible tone upon a receipt by the radiotelephone of a new message of a specified at least one category of broadcast message, and a step of specifying whether or not to generate an audible tone upon the storage by the radiotelephone of a received message of a specified at least one category of broadcast message.

Further in accordance with this invention the step of inputting includes a step of specifying a text string in conjunction with a specified at least one category of broadcast message, and the radiotelephone notifies the user of a receipt of a broadcast message that is within a specified category and that includes the specified text string.

Further in accordance with this invention the controller is responsive to input information for updating a stored message within a particular category only upon a receipt of a new message within the same category.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

This invention is described in the context of a radiotelephone or mobile terminal that operates in accordance with an analog (FM) mode and a Time Division Multiple Access (TDMA) digital mode of operation (dual-mode), as specified in the dual-mode Interim Standard IS-136 and its future revisions. However, it should be realized that the teaching of this invention may be employed in an all-digital radiotelephone, and may also be employed in a radiotelephone that operates with spread spectrum (SS) and Code Division Multiple Access (CDMA) techniques, such as that described in the IS-95 Standard.

Figure 1:
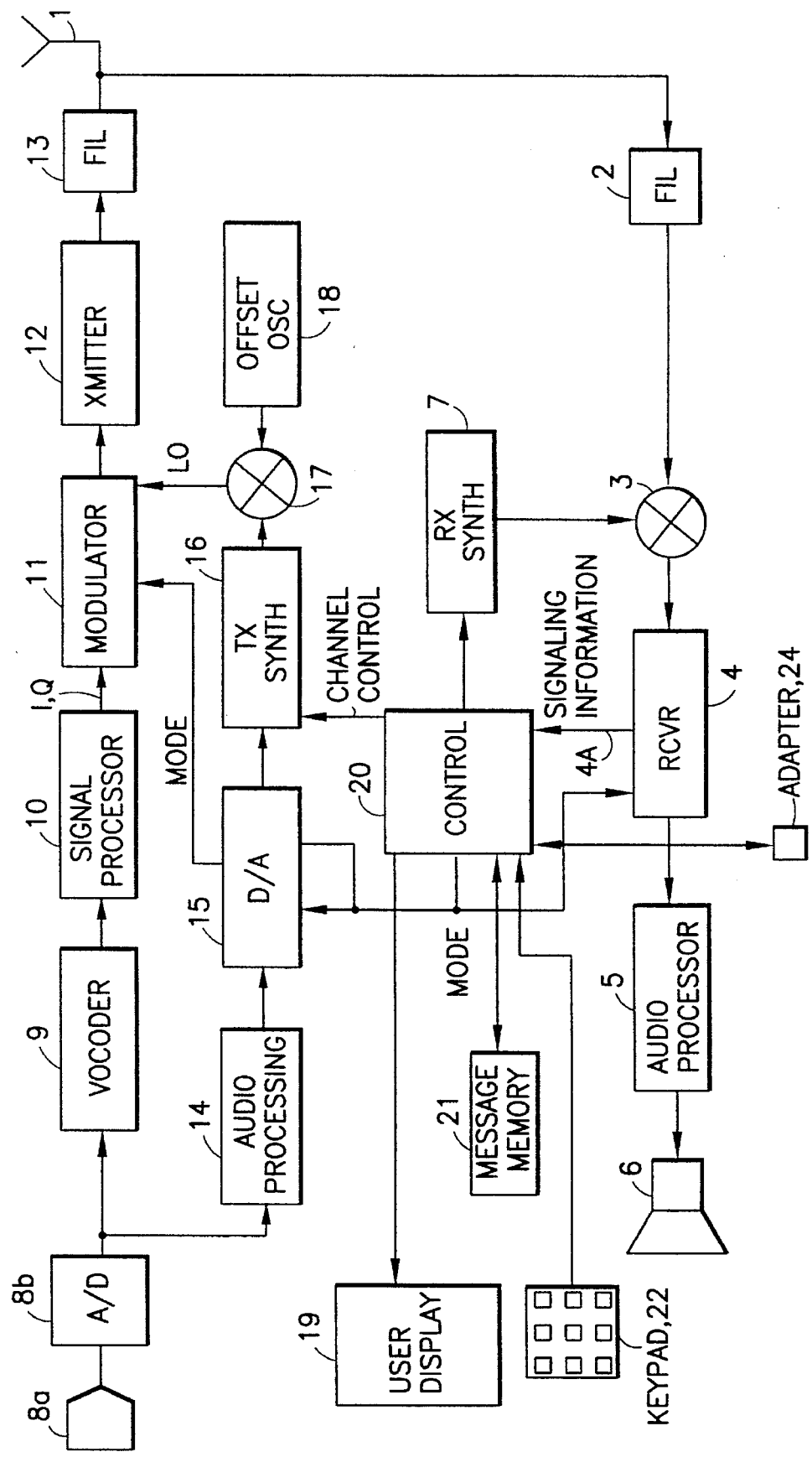
FIG. 1 is block diagram of a radiotelephone that is constructed and operated in accordance with this invention.

FIG. 1 illustrates a block diagram of a dual-mode mobile terminal (IS-136 compatible) that is constructed in accordance with the invention. An antenna (1) receives a signal from a base station (not shown). The received signal has a center frequency of 885 MHz. The received signal is fed through a bandpass filter (2) to a mixer (3). The receiver's first local oscillator signal is generated with an RX-synthesizer (7) which is tuned above the received frequency by an amount equal to, by example, 45 MHz. The receiver block (4) demodulates and processes the received signal and provides the processed received signal, for voice information, to an audio processing block (5). The required audio processing is accomplished digitally (using a digital to analog converter) or in an analog manner, depending on the operating mode. The output of the audio processor 5 drives a loudspeaker (6) whereby a user is enabled to hear the speech of another party during a conversation.

For the case where the Short Message Service Broadcast Channel (S-BCCH) is being received, the S-BCCH information is extracted from the received signal by the receiver block (4), and the extracted digital information is input to a controller (20) on a path (4A). In this regard the controller (20) manages various counters to maintain synchronization with the Hyperframe and Superframe counters and indicators of the B-SMS, as described previously.

Having described the receiving side, a description is now given of the transmitting side of the dual-mode mobile terminal. A voice signal is fed from a microphone (8) to an analog to digital (A/D) converter (Sa) and thence to a vocoder (9), in the digital mode, or to an audio processing block (14) for audio shaping and companding in the analog mode. After audio processing, the analog signal is fed to a digital to analog converter (D/A) (15) for conversion back to an analog signal. The operation of the D/A converter (15) is controlled by the controller (20), preferably implemented as one or more microprocessors that operate under a control program.

In a presently preferred embodiment of this invention there are two microprocessors. One is a high speed digital signal processor (DSP) that manages the Layer 1 and Layer 2 real-time interface to the radio channel. The second microprocessor (MCU) is a slower speed device that is responsible for managing the user interface, via a keypad (22) and a user display (19), and also the Layer 3 and above real-time interface to the radio channel. The Layers 1, 2 and 3 are illustrated in, by example, FIGS. 2-1 and 2-2 of the IS-136 rev. 0 specification. For simplicity, the DSP and the MCU are collectively illustrated in FIG. 1 as the controller (20).

In the digital mode of operation the controller (20) causes the output signal from the D/A converter (15) to assume a predetermined level, or to be switched out and replaced by a predetermined potential. In the analog mode of operation the controller (20) causes the output of the D/A converter (15) to be coupled to the input of a programmable oscillator of a transmitter synthesizer (Tx SYNTH) (16). That is, the output frequency of the TX-synthesizer (16) is varied in accordance with the input audio signal, thereby achieving a frequency modulation of the TX-synthesizer (16) output frequency. The controller (20) also operates to frequency modulate the TX-synthesizer (16) output frequency in accordance with signalling information to be transmitted. The TX-synthesizer (16) output frequency is also controlled to achieve channel switching.

The output frequency of the TX-synthesizer (16) is applied to a mixer (17) wherein it is mixed with the output of an offset oscillator (18) to generate a transmitter injection signal (LO) at the final transmitter frequency (840 Mhz). The offset oscillator (18) is typically set to 90 Mhz. A further oscillator (not shown) may provide a synchronizing frequency to the RX SYNTH (7), the TX SYNTH (16), and the offset oscillator (18).

It should be realized that the exact frequencies of the transmitter and receiver synthesizers (7) and (16) and the offset oscillator (18) are adjustable according to application specific requirements. The values given above are suitable for use in the dual-mode Interim Standard specified in IS-136, and are not intended to be read in a limiting sense upon the practice of the invention.

As was indicated previously, the mobile terminal also includes the user display (19) and the keypad (22), each of which is coupled to the controller (20). Although the user display (19) and keypad (22) may be used in a conventional manner to place a call, their use is extended by the teaching of this invention to provide a novel interface for short message service (SMS) functions of a type referred to in the Background portion of the specification. A message memory (21) is also provided. The message memory (21) may be a part of the random access memory of the controller (20), and/or may be implemented with a non-volatile memory (e.g., EEPROM).

Figure 2:
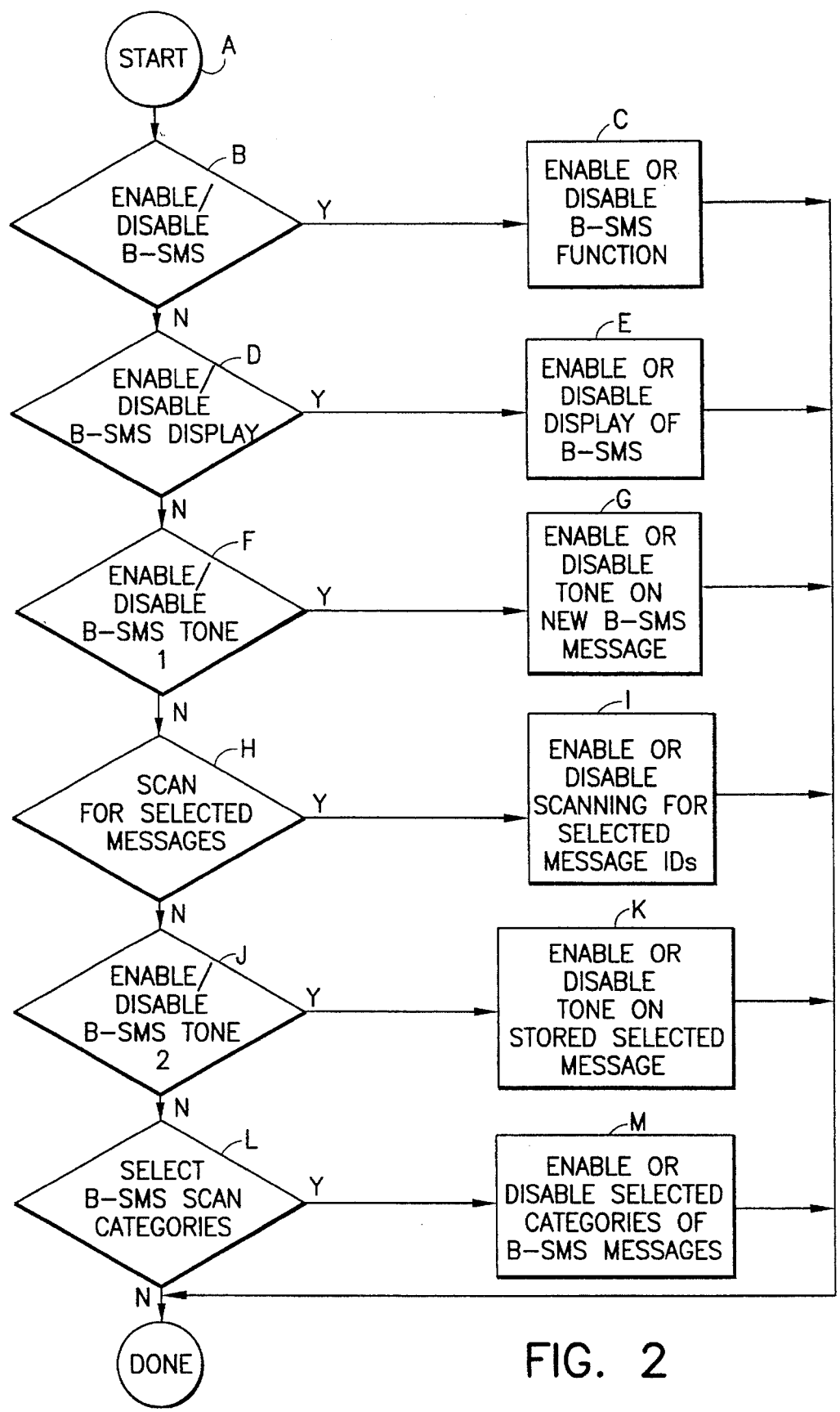
FIG. 2 is a logical flow chart of a method in accordance with this invention.

Referring to FIG. 2, a user of the mobile terminal of FIG. 1 employs the keypad (22) to enter information into the controller (20). This preferably occurs during a time that the controller (20) displays a B-SMS menu on the display (19).

At block A the user interface is initialized and the B-SMS menu is displayed. At block B a first menu function can be invoked by the user for enabling/disabling B-SMS reception. If this menu function is invoked control passes to block C where the controller (20) sets a flag to either enable or disable the reception of the B-SMS information. It may be desirable to disable the reception of the B-SMS information to maximize the battery life of the mobile terminal. Control then passes to the block labeled DONE.

Alternately, an enable/disable B-SMS display menu function can be enabled at block D. If this function is selected control passes to block E where the controller (20) sets a flag to selectively enable or disable the display of B-SMS message data on the user display (19).

Alternately, at block F an enable/disable of a first B-SMS audible tone is selected. If this function is enabled the controller (20) at block G sets a flag to enable or disable the generation of an audible tone on the occurrence of a new B-SMS message. The audible tone can be generated by the controller (20) by programming a digital to analog converter that forms a portion of the audio processor block (5). The audible tone is generated when, after all B-SMS channels have been scanned by the controller (20), a new message (with a new message ID) is located. The new message is then displayed if the display has not been disabled at block E. In this regard the controller (20) may store the header portion of all received messages. The stored header contains the start strings from all messages currently being transmitted on the B-SMS channels. The controller (20) may then monitor the B-SMS continuously and update the stored header information as appropriate. Deleted messages can be removed from the header list while new messages are added to the header list.

Alternately, at block H a scan for selected messages function can be enabled. If this function is enabled control passes to block I where the controller (20) sets a flag to enable or disable the scanning of the B-SMS for selected message IDs. During the operation of this function, all message headers belonging to a user-selected category list (e.g., news information, financial information, etc.) are indicated to the controller (20). After selection of a specific message ID the controller (20) will receive and store the complete message and, optionally, also some predetermined number (e.g., 5) of subsequent messages. After the messages have been stored in the message memory 21, the user is enabled to read the stored messages using a scroll key function found on the keypad (22). This scroll key function forms a portion of the conventional user interface. Messages remain stored until the user chooses another message ID to be displayed.

Alternately, at block J an enable/disable second B-SMS audible tone can be enabled. If this function is enabled control passes to block K where the controller (20) sets a flag to enable or disable the generation of an audible tone to indicate when the controller (20) has received and stored a user selected message from the B-SMS channel. If the second audible tone is disabled the controller (20) instead displays the beginning of the received message without audibly notifying the user.

Alternately, at block L the user is enabled to select B-SMS scan categories for the controller (20). If enabled, the controller (20) displays a list of B-SMS category types and the user employs the keypad (22) to select one or more category types. In response, the controller (20) sets flags to enable only the selected B-SMS category types for reception. All messages that belong to a selected category will be either displayed or stored in the message memory (21). The second audible tone, if enabled at block K, is generated to alert the user that the controller (20) has received a message that matches one of the selected categories, after which the received message is displayed. In addition to the category selection menu a menu may also be displayed enabling keyword selection for messages that fall under the selected category. By example, if the financial message category is selected, the user may enter a keyword, such as the name of a particular company or stock. If the controller (20) receives a financial category message, and if the indicated keyword occurs within the message, then the message is displayed and the second audible tone generated, if enabled at block K.

If the broadcast B-SMS has been enabled on any combination of, or on all, SMS categories and channels, the controller (20) will receive all messages for this combination. These messages are then either displayed, stored, or discarded. After all messages on user selected channels and categories have been received once, the controller (20) will thereafter only respond to updated messages. In this mode the controller (20) displays as much of the new message as it is able to display to enable the user time to read the message. In this reception mode the display (19) is scrolled to show all messages being received. If more messages are received than can be displayed with enough time for the user to read the message (e.g., 2 seconds), the controller (20) may truncate the messages before display. In this regard all messages can be truncated by some predetermined amount. Alternatively, selected message types can be prioritized by the user at block M, such as by the order of selection, and higher priority messages truncated less than lower priority messages. If the mobile terminal is connected via an adapter (24) (FIG. 1) to an external data processor or other device capable of message storage, all received messages can be output through the adapter (24) for storage and subsequent later display. In this regard it is noted that the above-described user interface functions illustrated in FIG. 2 can also be accomplished through the adapter (24), wherein the display of an attached data processor is used in place of the display (19), and wherein the keyboard or pointing device of the attached data processor is used in place of the keypad (22). A command or a keystroke(s) sequence, if received by the controller (20) through the adapter (24), can be employed to cause the controller (20) to direct data to the adapter for external display, and to respond to information entered through the adapter (24).

It is noted that the B-SMS functions in a manner analogous to a videotext service, and periodically transmits all messages selected for broadcast. All broadcast messages are specified in a header type of message which gives the message ID and category. All changes to the contents of a broadcast cycle on any of the four B-SMS channels can thus be given in the header message information. In addition, all changes can be indicated by a change flag on a paging channel which the controller (20) constantly monitors.

In order to conserve battery power it is preferred that the mobile terminal read only once the unchanged content of the B-SMS, and thereafter only by request of the user. Thus, if the B-SMS has been enabled for certain categories of messages, the mobile terminal will only read the selected category messages once and thereafter only in the case where new or updated message is received in the user-selected category or categories.

Although not shown in FIG. 2, a further menu function can be employed to control the scrolling of messages on the display 19.

While the invention has been particularly shown and described with respect to a preferred embodiment thereof, it will be understood by those skilled in the art that changes in form and details may be made therein without departing from the scope and spirit of the invention.

What is claimed is:

1. A method for operating a radiotelephone for receiving digitally encoded broadcast messages from a radio channel, comprising the steps of:

operating a user interface for inputting information to a controller of the radiotelephone, the information specifying at least one category of broadcast message to be received;

in response to the inputted information, receiving a broadcast message that belongs to the at least one category;

storing at least a portion of the received message in a memory of the radiotelephone; and displaying all or a portion of the stored message, wherein the message is received from a short message service broadcast channel.

2. A method as set forth in claim 1 wherein the step of inputting includes a step of specifying whether to display a stored message, and wherein the step of displaying displays all or a portion of the stored message only when the message is specified to be displayed.

3. A method as set forth in claim 1 wherein the step of inputting includes a step of specifying whether to generate an audible tone upon a receipt by the radiotelephone of a new message of a specified at least one category of broadcast message.

4. A method as set forth in claim 1 wherein the step of inputting includes a step of specifying whether to generate an audible tone upon the storage by the radiotelephone of a received message of a specified at least one category of broadcast message.

5. A method as set forth in claim 1 wherein the step of inputting includes a step of specifying a text string in conjunction with a specified at least one category of broadcast message, and wherein the radiotelephone notifies the user of a receipt of a broadcast message that is within a specified category and that includes the specified text string.

6. A method as set forth in claim 1 wherein the controller is responsive to input information for updating a stored message within a particular category only upon a receipt of a new message within the same category.

7. A radiotelephone adapted for receiving digital broadcast messages from a radio channel, comprising:

an antenna;

a receiver having an input coupled to said antenna;

a controller having an input coupled to an output of said receiver, said controller receiving digital broadcast messages from said receiver;

a memory that is bidirectionally coupled to said controller for storing at least portions of received broadcast messages; and a user interface including a display and a keypad for inputting information to said controller, the information specifying at least one category of broadcast message to be received;

wherein said controller is responsive to the inputted information for identifying a received broadcast message that belongs to the at least one category, for storing at least a portion of the received message in said memory, and for selectively displaying all or a portion of the stored message, and wherein the message is received from a short message service broadcast channel.

8. A radiotelephone as set forth in claim 7 wherein said controller is responsive to input information that specifies whether or not to display a stored message for displaying all or a portion of the stored message only when the message is specified to be displayed.

9. A radiotelephone as set forth in claim 7 wherein said radiotelephone further comprises means for generating an audible tone, and wherein said controller is responsive to input information that specifies whether or not to generate an audible tone upon a receipt of a new message of a specified at least one category of broadcast message, said controller being further responsive to input information for updating a stored message within a specified at least one category only upon a receipt of a new message within the same category.

10. A radiotelephone as set forth in claim 7 wherein said radiotelephone further comprises means for generating an audible tone, and wherein said controller is responsive to input information that specifies whether or not to generate an audible tone upon the storage by said controller of a received message of a specified at least one category of broadcast message.

11. A radiotelephone as set forth in claim 7 wherein said controller is responsive to input information that specifies a text string in conjunction with a specified at least one category of broadcast message for notifying the user of a receipt of a broadcast message that is within a specified category and that includes the specified text string.

12. A radiotelephone as set forth in claim 7 wherein the display and keypad form a portion of said radiotelephone.

13. A radiotelephone as set forth in claim 7 wherein the display and keypad are external to said radiotelephone.

14. A method for operating a mobile terminal for receiving digitally encoded broadcast messages from a radio channel, comprising the steps of:

operating a user interface for displaying a selection of broadcast message categories and, in response to the displayed categories, inputting information to a controller of the mobile terminal, the information specifying at least one category of broadcast message;

in response to the inputted information, receiving messages from a short message service broadcast channel;

for a received message that belongs to the at least one specified category, storing at least a portion of the received message in a memory of the mobile terminal; and selectively displaying all or a portion of the stored message.

15. A method as set forth in claim 14, wherein the step of inputting includes a step of prioritizing specified ones of the broadcast message categories.

16. A method as set forth in claim 15, wherein the step of selectively displaying includes a step of truncating displayed messages, and wherein higher priority messages are truncated less than lower priority messages.

17. A method as set forth in claim 14, wherein the step of inputting information also inputs information for specifying a string of characters, and wherein the step of storing stores all or a part of a received message belonging to a specified category of broadcast messages only if the received message also includes the specified string of characters.

18. A method as set forth in claim 14, wherein the step of inputting information also inputs information for specifying at least one of: (i) whether to display or not display received ones of broadcast messages; and (ii) whether to generate or not generate an audible tone in response to receiving a broadcast message.

19. A method as set forth in claim 14, wherein the step of receiving includes the steps of storing selected information from received broadcast messages; and monitoring further received broadcast messages to store selected information from only new broadcast messages.

20. A method as set forth in claim 14, wherein the steps of receiving and storing occur once for all messages in one or more selected message categories, and thereafter the step of storing occurs only for received messages that differ from stored messages.

* * * * *